United States Patent [19]
Freimuth

[11] 4,425,753
[45] Jan. 17, 1984

[54] CLUTCH MECHANISM FOR BALING MACHINE

[75] Inventor: John H. Freimuth, New Holland, Pa.

[73] Assignee: Sperry Corporation, New Holland, Pa.

[21] Appl. No.: 302,930

[22] Filed: Sep. 16, 1981

[51] Int. Cl.³ .......................................... A01D 39/00
[52] U.S. Cl. ..................................................... 56/341
[58] Field of Search ......................... 56/341, 342, 343; 100/88, 89, 99

[56] References Cited

U.S. PATENT DOCUMENTS

| | | | |
|---|---|---|---|
| 3,901,007 | 8/1975 | Blanshine et al. | 56/341 |
| 4,026,205 | 5/1977 | Blanshine et al. | 56/341 |
| 4,172,354 | 10/1979 | Vermeer et al. | 56/341 |
| 4,212,149 | 7/1980 | Krone et al. | 56/341 |
| 4,366,665 | 1/1983 | Van Ginhoven et al. | 100/88 |

*Primary Examiner*—Robert Peshock
*Attorney, Agent, or Firm*—Darrell F. Marquette; Larry W. Miller; Frank A. Seemar

[57] ABSTRACT

A roll baling machine includes a floor roller and an apron movable in suitable manner to form roll bales of crop material. A clutch mechanism is provided to connect the floor roller and the apron to the power take off unit (PTO) of a tractor so that they will be driven during bale forming. The clutch mechanism disconnects the floor roller and the apron from the tractor PTO while a completed bale is being discharged from the machine.

6 Claims, 7 Drawing Figures

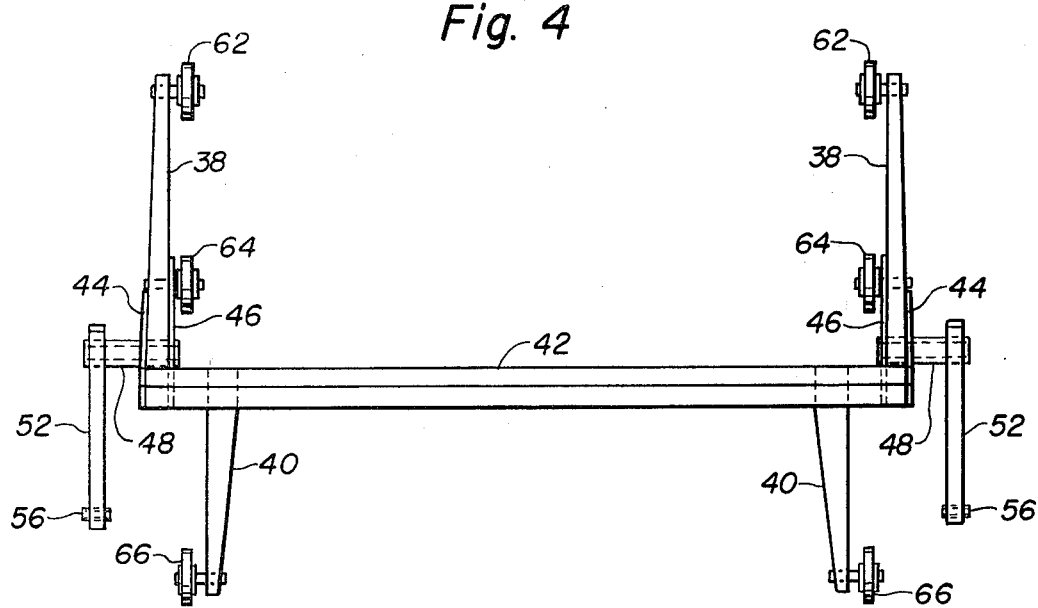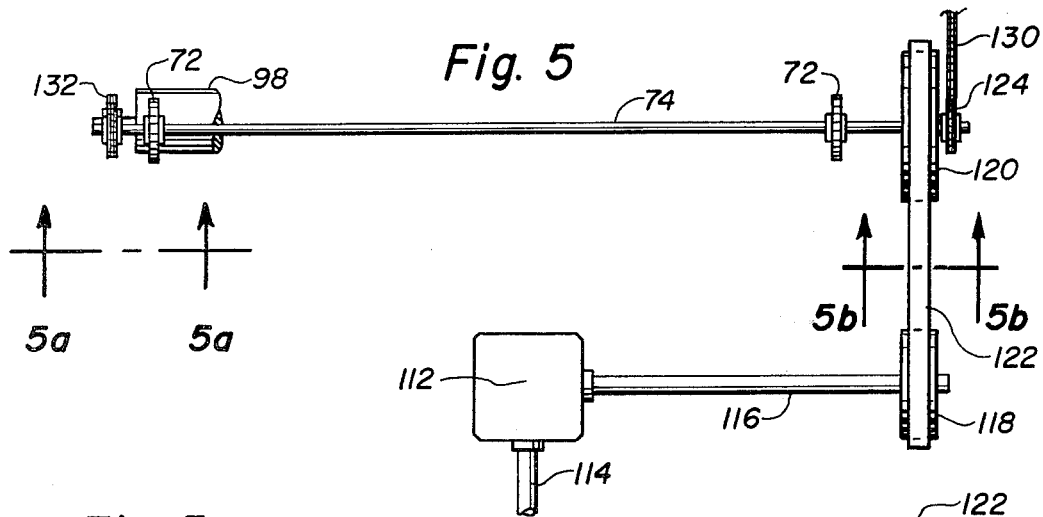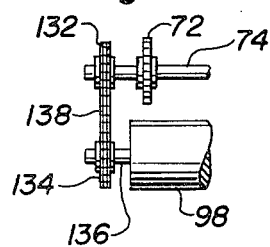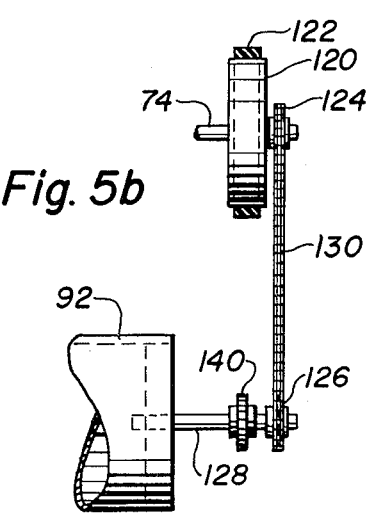

CLUTCH MECHANISM FOR BALING MACHINE

BACKGROUND OF THE INVENTION

This invention relates generally to baling machines typically referred to as "round balers" which form cylindrical roll bales of crop material.

In a conventional type of roll baling machine such as shown in U.S. Pat. No. 3,901,007, an upper apron and a lower apron cooperate to form a roll bale of crop material that is supported on the lower apron. The upper and lower aprons are driven by the power take off unit (PTO) of a tractor during bale forming. When it is desired to discharge a completed roll bale from the machine, the standard procedure is to stop the tractor PTO, then raise the rear frame of the baling machine, and then restart the tractor PTO to drive the lower apron which carries the bale rearwardly where it may be discharged from the baling machine. When the rear frame is raised, the upper apron is declutched from the tractor PTO and thus is not driven when the PTO is restarted. This procedure is recommended because if the tractor PTO is not stopped before the rear frame is raised, the bale may be carried rearwardly by the lower apron and actually interfere with the raising of the rear frame. This procedure is, however, undesirable because it is time consuming.

SUMMARY OF THE INVENTION

The present invention provides a roll baling machine including a base frame, a rear frame pivotally connected to the base frame for movement between a lower position and an upper position, a floor roller movably mounted on the base frame for supporting crop material, and bale forming means movably supported on the base frame for forming a roll bale of crop material. The machine also includes first drive means adapted for receiving power from a tractor, and second drive means adapted for receiving power from the first drive means. The seocnd drive means is connected to the floor roller and the apron means for imparting movement to them in a first direction during bale formation.

The machine of the present invention also has clutch means which drivingly connects the first and second drive means when the rear frame is in its lower position. This causes the second drive means to impart movement to the floor roller and the bale forming means in the first direction. The clutch means drivingly disconnects the first and second drive means when the rear frame is moved to its upper position. This precludes the second drive means for imparting movement to the floor roller and the ball forming means in the first direction.

BRIEF DESCRIPTION OF THE DRAWINGS

FIG. 4 is an enlarged plan view of the arm assembly of the machine;

FIG. 5 is an enlarged plan view of a portion of the driven means of the machine;

FIG. 5a is a view taken along the lines 5a—5a of FIG. 5; and

FIG. 5b is a view taken along the line 5b—5b of FIG. 5.

DESCRIPTION OF THE PREFERRED EMBODIMENT

Figure 1:
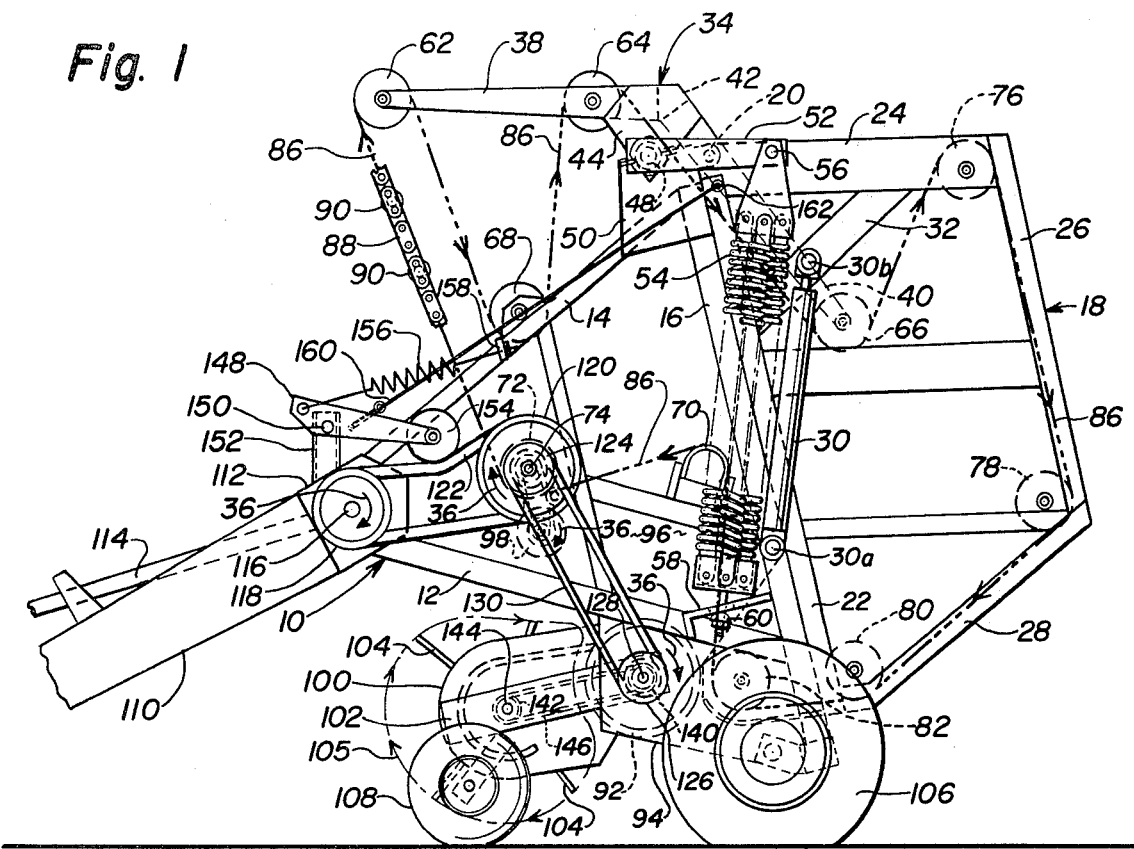
FIG. 1 is a side elevational view of a roll baling machine embodying the present invention taken when the machine is empty.
Figure 2:
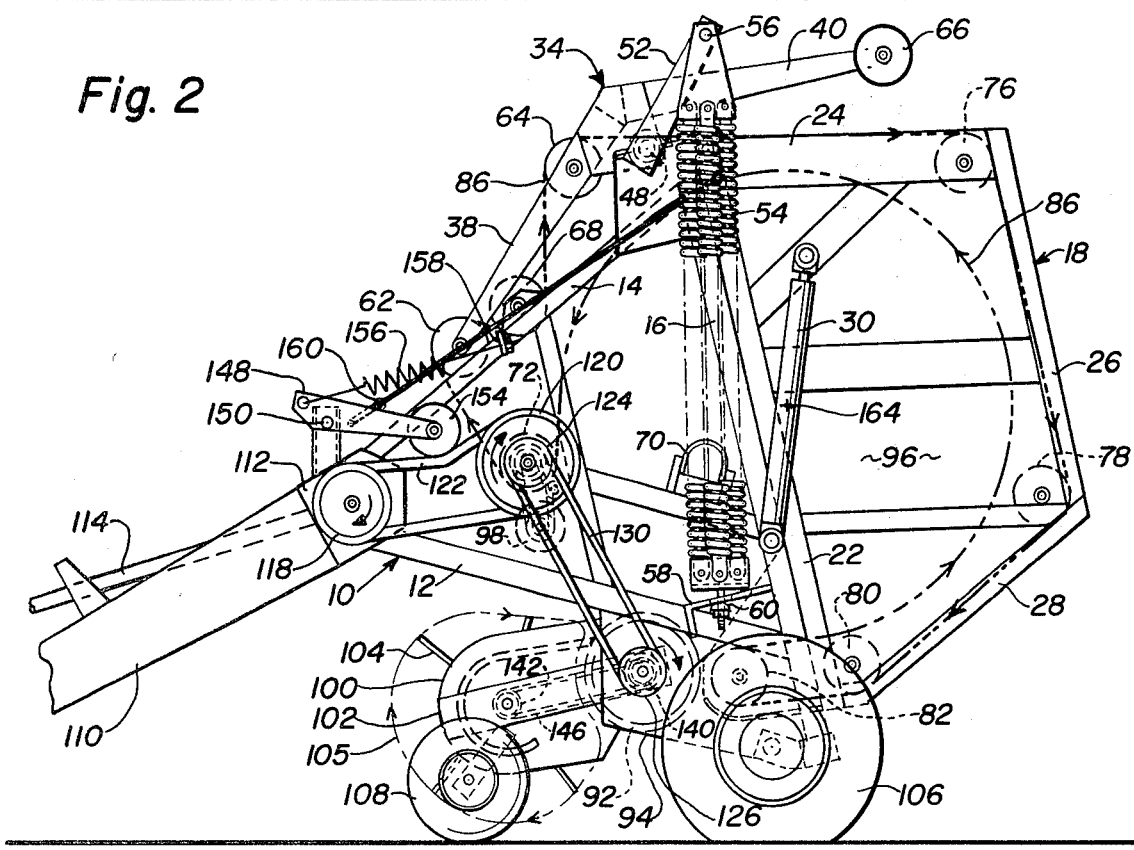
FIG. 2 is a side elevational view of the machine shown in FIG. 1 when a bale has been formed and is disposed in the machine.
Figure 3:
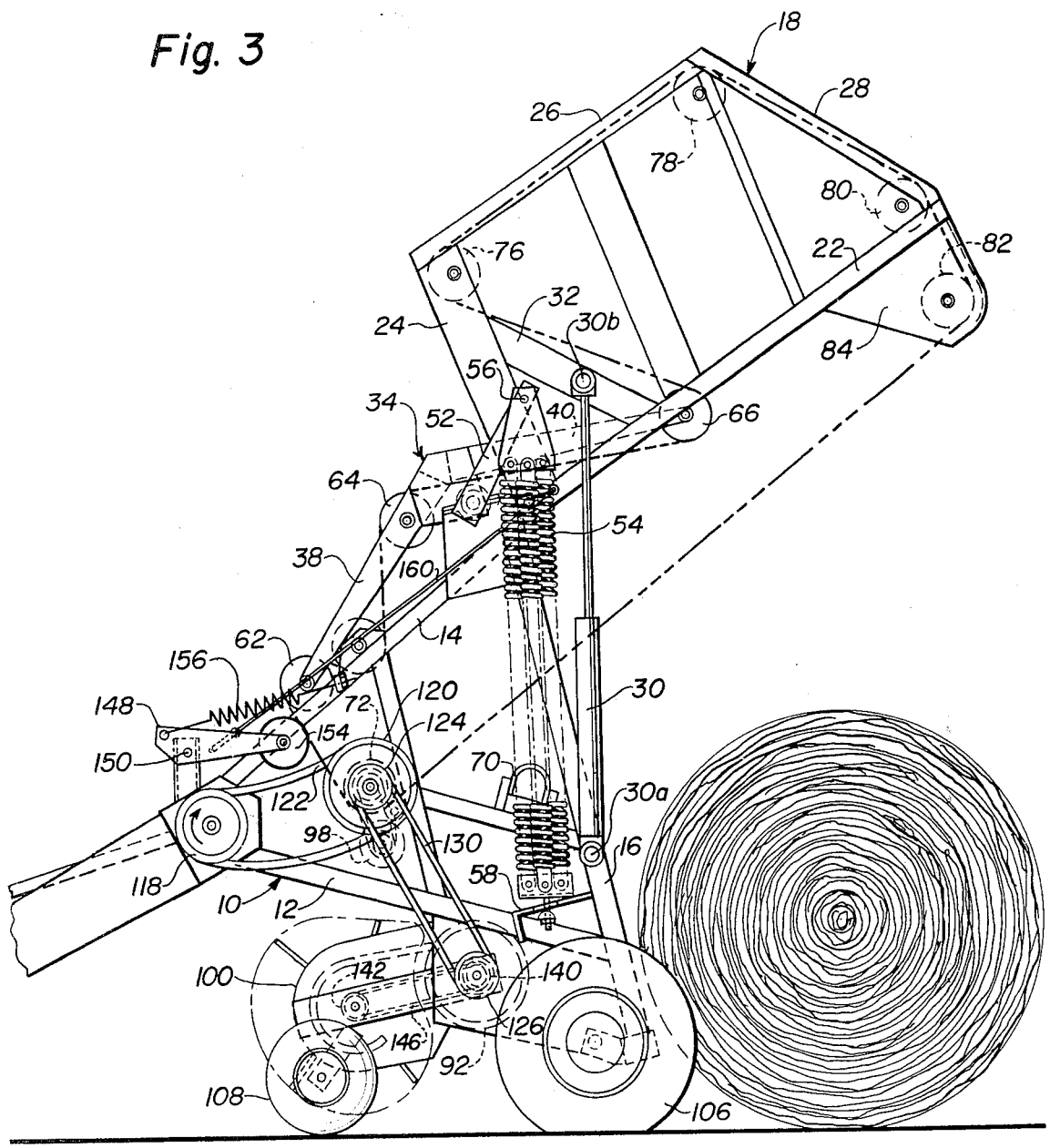
FIG. 3 is a side elevational view of the machine of FIG. 1 when the bale has been discharged from the machine.

Referring to FIG. 1, the roll baling machine embodying the present invention includes a base frame 10 having opposite sides each formed generally of frame members 12,14,16 rigidly connected in a triangular configuration with side plates substantially covering the space therebetween. A rear frame 18 is pivotally connected at 20 to the base frame 10 by suitable bearings. The rear frame 18 has opposite sides each formed generally of frame members 22,24,26,28 rigidly connected in a substantially trapezoidal configuration with side plates substantially covering the space therebetween. Other frame members (not shown) extend transversely of the machine and connect the opposite sides of the base frame 10 and the opposite sides of the rear frame 18. In FIGS. 1-3, the forward end of the machine faces to the left and rearward end thereof faces to the right.

A pair of hydraulic cylinders 30 are mounted at the sides of the machine and are connected at their lower ends 30a to the frame members 16 of the base frame 10 and at their upper ends 30b to cross frame members 32 of the rear frame 18. The hydraulic cylinders 30 are operated in known manner to move the rear frame 18 from its lower position shown in FIG. 1 to its upper position shown in FIG. 3.

An arm assembly 34 is pivotally mounted on the base frame 10 and as also shown in FIG. 4, includes front arms 38 and rear arms 40 disposed inboard the sides of the machine. The front and rear arms 38,40 are rigidly connected to a cross beam 42 that extend transversely of the machine. The arm assembly 34 also has plates 44 and 46 disposed inboard the sides of the machine rigidly attached to the cross beam 42 and to the front arms 38. The plates 44,46 fixedly support shafts 48 which are rotatably mounted in bearing members carried by brackets 50 on the opposite sides of the base frame 10.

The arm assembly 34 also includes auxiliary arms 52 disposed outboard the sides of the machine rigidly connected to the shafts 48. A pair of tension spring sets 54 are mounted at the sides of the machine and are pivotally connected by pins 56 at their upper ends to the auxiliary arms 52 of the arm assembly 34. Each tension spring set 54 consists of four coil springs connected between upper and lower mountings and arranged in a diamond-shaped pattern. The tension spring sets 54 are anchored at their lower ends to brackets 58 on the opposite sides of the base frame 10 by threaded rod and nut arrangements 60. As viewed in FIG. 1, the tension spring sets 54 normally pull downward on the auxiliary arms 52 thereby resisting rotation of the arm assembly 34 in a counterclockwise direction. The rod and nut arrangements 60 are adjustable in known manner to vary the spring tension and thus vary the downward pull exerted on the auxiliary arms 52 by the tension spring sets 54.

The arm assembly 34 carries rotatable guide members 62,64 on the front arms 38 and rotatable guide members 66 on the rear arms 40. The base frame 10 supports rotatable guide members 68 and cam guide members 70 inboard its opposite sides. Preferably, the cam guide members 70 are of the known type disclosed in U.S. Pat. No. b 3,901,007 and designated therein by the numeral "118". Sprockets 72 are provided inboard the opposite sides of the base frame 10 and are fixed on a shaft 74 that is rotatably mounted in suitable bearings on the base frame 10. The rear frame 18 supports rotatable guide members 76,78,80,82 inboard its opposite sides. As best seen in FIG. 3, the guide members 82 are carried on brackets 84 projecting from the frame members 22 of the rear frame 18.

A flexible endless apron 86 is movably supported on the aforementioned guide members and sprockets following the path shown in FIG. 1 when the machine is empty. The apron 86 is preferably formed of a pair of endless link-type chains 88 connected at spaced intervals by transverse bars or slats 90 as seen in partial view in FIG. 1. The chains 88 extend around and engage the various guide members and the sprockets 72. This apron 86 is of the known type disclosed in U.S. Pat. No. 3,901,007 and designated therein by the numeral "82".

A floor roller 92 extends transversely of the machine and is rotatably supported by brackets 94 on the opposite sides of the base frame 10. Preferably, the floor roller 92 consists of a hollow metal drum with a coating or layer of rubber on its outer surface. When the machine is empty as seen in FIG. 1, the upper surface of the floor roller 92 cooperates with the course of the aprom 86 that extends upwardly and rearwardly from the guide members 82 over the cam guide members 70 and then downwardly and forwardly to the sprockets 72 to define a bale chamber 96 having an initial wedge shape in side elevation. In this initial wedge shape, the forward end of the bale chamber 96 is narrower than the rearward end thereof. A stripper roller 98, preferably rubber coated, extends transversely of the machine and is rotatably supported on the opposite sides of the base frame 10. The stripper roller 98 is positioned at the forward end of the bale chamber 96 in close proximity to the apron 86.

A pickup header 100 extends transversely of the machine and is supported by brackets 102 on the opposite sides of the base frame 10. The pickup header 110 is preferably of conventional type having a series of projecting fingers 104 rotating in the path 105 for engaging and picking up windrowed crop material. A pair of wheels 106 mounted on the opposite sides of the base frame 10 support the machine. Another part of wheels 108 are mounted to the brackets 102 to provide support primarily for the pickup header 100.

A tongue 110 is provided on the forward end of the base frame 10 for connection to a tractor. A gear box 112 is mounted on the base frame 10. An input shaft 114 is connected at one end to the gear box 112, and the other end of the input shaft 114 is adapted for connection to the power take off unit (PTO) of a tractor (not shown). An output shaft 116, as also seen in FIG. 5, extends from the gear box 112 toward the side of the machine shown in FIG. 1 and has a sheave 118 fixed thereto. Another sheave 120 is fixed on the shaft 74 at the same time of the machine as the sheave 118, and a belt 122 extends around the sheaves 118 and 120. A sprocket 124 is fixed on the shaft 74 adjacent the sheave 120 and, as seen in FIG. 5b, a sprocket 126 is fixed on the floor roller support shaft 128. A chain 130 extends around the sprockets 124 and 126. A sprocket 132 is fixed on the shaft 74 at the other side of the machine. A sprocket 134 is fixed on the stripper roller support shaft 136, as seen in FIG. 5a, at the same side of the machine as the sprocket 132. A chain 138 extends around the sprockets 132 and 134. Another sprocket 140 is fixed on the floor roller support shaft 128 adjacent the sprocket 126. A sprocket 142 is provided on the shaft 144 of the pickup header 100 at the same side of the machine as the sprocket 140. A chain 146 extends around the sprockets 140 and 142.

An arm 148 is pivoted by a pin 150 on a bracket 152 that is carried on the base frame 10. The arm 148 carries a rotatable sheave 154 in position for engaging the belt 122. A spring 156 is connected at one end to the arm 148 and at the other end to a bracket 158 on the frame member 14 of the base frame 10. A cable 160 is connected at one end to the arm 148 and at the other end to a pin 162 on the frame member 22 of the rear frame 18. When the rear frame 18 is in its lower position of FIG. 1, the spring 156 pulls the arm 148 in a direction to firmly engage the sheave 154 with the belt 122. This tightens the belt 122 and provides a driving connection between the sheaves 118,120 via the belt 122. At the same time, the cable 160 is slack and thus has no effect on the arm 148. When the rear frame 18 is in its upper position of FIG. 3, the cable 160 is pulled tight and as a result pulls the arm 148 in a direction against the force of the spring 156 so that the sheave 154 is moved out of engagement with the belt 122. This allows slack in the belt 122, and the sheave 120 is drivingly disconnected from the sheave 118. The arm 148, sheave 154, spring 156 and cable 160 thus form a clutch mechanism for drivingly connecting and disconnecting the sheaves 118 and 120.

Referring to FIG. 1, rotary driving power is delivered from the PTO of a tractor through the input shaft 114, the gear box 112, and the output shaft 116 to the sheave 118. This causes rotation of the sheave 118 in the direction 36 which in turn causes rotation of the sheave 120 in the same direction 36 via the belt 122. The rotation of the sheave 120 causes rotation of the shaft 74 and the sprockets 72, 124 and 132 fixed thereto. The sprockets 72 drive the apron chains 88 thereby propelling the apron 86 around the various guide members in the base frame 10 and the rear frame 18 in the direction and along the path indicated. The sprocket 124 drives the sprocket 126 via the chain 130 thereby rotating the floor roller 92 in the same direction 36. The sprocket 132 drives the sprocket 134 via the chain 138 thus rotating the stripper roller 98 in the time direction 36. The rotation of the floor roller 92 in turn causes rotation of the sprocket 140. The sprocket 140 drives the sprocket 142 via the chain 146 thereby rotating the fingers 104 of the pickup header 100 in the same direction 36. The various chains and sprockets may be sized so that the parts of the machine operate at any desired speeds. For example, the apron chains 88, the chain 130, and the sprockets 72, 124, 126 are preferably sized so that the peripheral speed of the floor roller 92 is equal to or slightly higher than the speed of the apron 86. This tends to keep a roll of crop material toward the rearwrd end of the machine during formation.

As the machine is pulled across a field by a tractor, the pickup header fingers 104 engage, pickup and deliver windrowed crop material onto the upper surface of the rotating floor roller 92 in the bale chamber 96. The crop material is carried upwardly and then coiled back downwardly onto itself by the arpon 86 which moves upwardly and rearwardly from the guide members 82 over the cam guide members 70 and then downwardly and forwardly to the sprockets 72. This movement of the apron 86 in the bale chamber 96 effectively starts the core of the roll bale. The rotating stripper roller 98 removes crop material from the apron 86 at the forward end of the bale chamber 96 and delivers it back downwardly into the bale chamber 96. The roll bale increases in diameter lifting the inner course of the apron 86 that extends between the guide members 82 and the sprockets 72 off the cam guide members 70, and expanding the bale chamber 96 from its initial wedge shape to a substantially circular shape. The expansion of the bale chamber 96 results in movement of the inner course of the apron 86 into the rear frame 18. This movement of the apron 86 is accomplished by rotation of the arm assembly 34 in a counterclockwise direction against the force of the spring sets 54 from the position shown in FIG. 1. When the bale reaches its maximum diameter, a substantial amount of the inner course of the apron 86 is disposed inside the rear frame 18 and the arm assembly 34 is rotated to the position shown in FIG. 2.

When it is desired to discharge the completed bale from the machine, the hydraulic cylinders 30 are operated to raise the rear frame 18 to its upper position shown in FIG. 3. This stretches the inner course of the apron 86 across the space between the guide members 82 and the sprockets 72 thereby assisting the bale to exit the machine. The bale rotates in a clockwise direction as viewed in FIG. 3 as it exits the machine. The raising of the rear frame 18 also drivingly disconnects the sheave 120 from the sheave 118 in the manner explained above, thereby shutting off all power to the functional parts of the machine. Consequently, the apron 86, floor roller 92, stripper roller 98, and pickup header 100 stop rotating in the direction 36 and the bale may be discharged without stopping the tractor PTO. The rear frame 18 is then moved back to its lower position shown in FIG. 1 thus drivingly reconnecting the sheaves 118, 120 in the manner explained above and returning the apron 86 and the arm assembly 34 to their positions shown in FIG. 1. The machine is now ready to make another bale.

As the bale increases in diameter during formation, it moves rearwardly of the machine so that it extends into the rear frame 18. When the bale reaches maximum diameter, its longitudinal axis 164 and the major portion of the bale will be located inside the rear frame 18 as seen in FIG. 2. The bale is thus positioned so that it will tend to drop out of the machine due to the force of gravity when the rear frame 18 is raised without relying on the floor roller 92 to at least assist in discharging the bale.

Since the spring sets 54 resist rotation of the arm assembly 34 in a counterclockwise direction as seen in FIGS. 1 and 2, the inner course of the apron 86 that extends between the guide members 82 and the sprockets 72 is maintained in constant engagement with the peripheral surface of the bale and constantly applies pressure thereto during bale formation. This results in a properly shaped bale of desired density. It will be understood that adjustment of the rod and nut arrangements 60 on the spring sets 54 will vary the pressure applied to the peripheral surface of the bale by the inner course of the apron 86. Therefore, bales of any desired density may be formed.

When the machine starts to form a bale, the arm assembly 34 is positioned as seen in FIG. 1 with its front arms 38 extending forwardly and substantially horizontal and its rear arms 40 extending rearwardly and downwardly into the rear frame 18 at approximately a 60° angle relative to the horizontal. In this position, the guide members 62, 64 carried on the front arms 38 engage the inner surfaces of the apron chains 88 and the guide members 66 carried on the rear arms 40 engage the outer surfaces of the apron chains 88 at locations inside the rear frame 18. The arm assembly 34 rotates about 65° during formation of a bale. When a completed bale has been formed, the front arms 38 extend forwardly and downwardly toward the base frame 10 and the rear arms 40 extend rearwardly slightly above horizontal as seen in FIG. 2. In this latter position, the guide member 62, 64 still engage the inner surfaces of the apron chains 88 but the guide members 66 are spaced from and do not engage the outer surfaces of the apron chains 88.

The arm assembly 34 is not limited to use on the particular type of roll baling machine shown in FIGS. 1-3. For example, the arm assembly 34 may be used on the type of roll baling machine disclosed in U.S. Pat. No. 3,901,007.

The present invention is not limited to the particular type of apron 86. Accordingly, other types of aprons such as the type of apron formed of a series of endless flat belts may be used.

The present invention is not limited to the use of the single floor roller 92. Therefore, a plurality of floor rollers may be utilized.

The following claims are intended to cover all modifications and variations of the preferred embodiments of the invention without departing from the spirit and scope of the invention.

Having thus described the invention, what is claimed is:

1. A roll baling machine, comprising:
   (a) a base frame;
   (b) a rear frame pivotally connected to said base frame for movement between a lower position and an upper position;
   (c) a floor roller movably mounted on said base frame for supporting crop material;
   (d) bale forming means movably supported on said base frame cooperating with said floor roller for forming a roll bale of crop material;
   (e) first drive means on said base frame adapted for receiving power from a tractor;
   (f) second drive means on said base frame adapted for receiving power from said first drive means, said second drive means connected to said floor roller and said bale forming means for imparting movement to said floor roller and said bale forming means in a first direction during formation of a roll bale;
   (g) clutch means drivingly connecting said first and second drive means when said rear frame is in its lower position so that said second drive means imparts movement to said floor roller and said bale forming means in said first direction; and
   (h) said clutch means drivingly disconnecting said first and second drive means when said rear frame is moved to its upper position so that said second drive means is precluded from imparting movement to said floor roller and said bale forming means in said first direction.

2. The roll baling machine defined in claim 1, further comprising pickup means movably supported on said base frame for picking up crop material from the ground, said second drive means connected to said pickup means, and, due to said clutch means, imparting movement thereto in said first direction when said rear frame is in its lower position and being precluded from imparting movement thereto in said first direction when said rear frame is moved to its upper position.

3. The roll baling machine defined in claims 1 or 2, further comprising a stripper roller movable supported on said base frame for removing crop material from said apron means, said second drive means connected to said stripper roller, and, due to said clutch means, imparting movement thereto in said first direction when said rear frame is in its lower position and being precluded from imparting movement thereto in said first direction when said rear frame is moved to its upper position.

4. The roll baling machine defined in claim 1, further comprising:
 (a) said first drive means including a first sheave;
 (b) said second drive means including a second sheave;
 (c) a belt extending between said first and second sheaves;
 (d) said clutch means tightening said belt thereby drivingly connecting said first and second sheaves when said rear frame is in its lower position; and
 (e) said clutch means allowing slack in said belt thereby drivingly disconnecting said first and second sheaves when said rear frame is moved to its upper position.

5. The roll baling machine defined in claim 4, wherein said clutch means comprises:
 (a) an arm pivoted on said base frame for engaging said belt;
 (b) a spring connected between said arm and said base frame urging said arm into a position to tighten said belt and drivingly connect said first and second sheaves when said rear frame is in its lower position; and
 (c) a cable connected between said arm and said rear frame moving said arm into another position to allow slack in said belt and drivingly disconnect said first and second sheaves when said rear frame is moved to its upper position.

6. The roll baling machine defined in claim 1, wherein said bale forming means comprises apron means including endless flexible members and transverse members extending between and interconnecting said endless flexible members.

* * * * *